United States Patent [19]
Galperin et al.

[11] Patent Number: 5,270,272
[45] Date of Patent: Dec. 14, 1993

[54] SULFUR REMOVAL FROM MOLECULAR-SIEVE CATALYST

[75] Inventors: Leonid Galperin, Chicago; Robert S. Haizmann, Rolling Meadows, both of Ill.

[73] Assignee: UOP, Des Plaines, Ill.

[21] Appl. No.: 889,689

[22] Filed: May 26, 1992

[51] Int. Cl.$^5$ .................. B01J 29/38; B01J 38/44; B01J 38/08; C10G 35/095
[52] U.S. Cl. .................. 502/37; 208/140; 502/54; 502/517
[58] Field of Search .............. 502/54, 517, 34, 37; 208/140, 111, 150

[56] References Cited

U.S. PATENT DOCUMENTS

| | | | |
|---|---|---|---|
| 4,002,575 | 1/1977 | Ward | 502/54 |
| 4,070,305 | 1/1978 | Obayashi et al. | 502/517 |
| 4,399,051 | 8/1983 | Rabinovich et al. | 252/415 |
| 4,493,901 | 1/1985 | Bernard et al. | 502/37 |
| 4,619,906 | 10/1986 | Lambert et al. | 502/66 |
| 4,810,683 | 3/1989 | Cohn et al. | 502/37 |
| 4,822,762 | 4/1989 | Ellig et al. | 502/66 |
| 4,851,380 | 7/1989 | VanLeirsburg et al. | 502/35 |
| 4,855,269 | 8/1989 | Mohr | 502/37 |
| 4,925,819 | 5/1990 | Fung et al. | 502/37 |

FOREIGN PATENT DOCUMENTS 2176716A 11/1985 United Kingdom.

*Primary Examiner*—Paul E. Konopka
*Attorney, Agent, or Firm*—Thomas K. McBride; John F. Spears, Jr.; Richard E. Conser

[57] ABSTRACT

A sulfur-sensitive catalyst which has been deactivated by accumulating sulfur on the catalyst is desulfurized by contact with ammonia at high temperature. The technique is particularly effective for reforming catalysts containing a large-pore zeolite which are selective for dehydrocyclization of paraffins. The desulfurization may be combined with regeneration for coke removal from the catalyst.

7 Claims, 2 Drawing Sheets

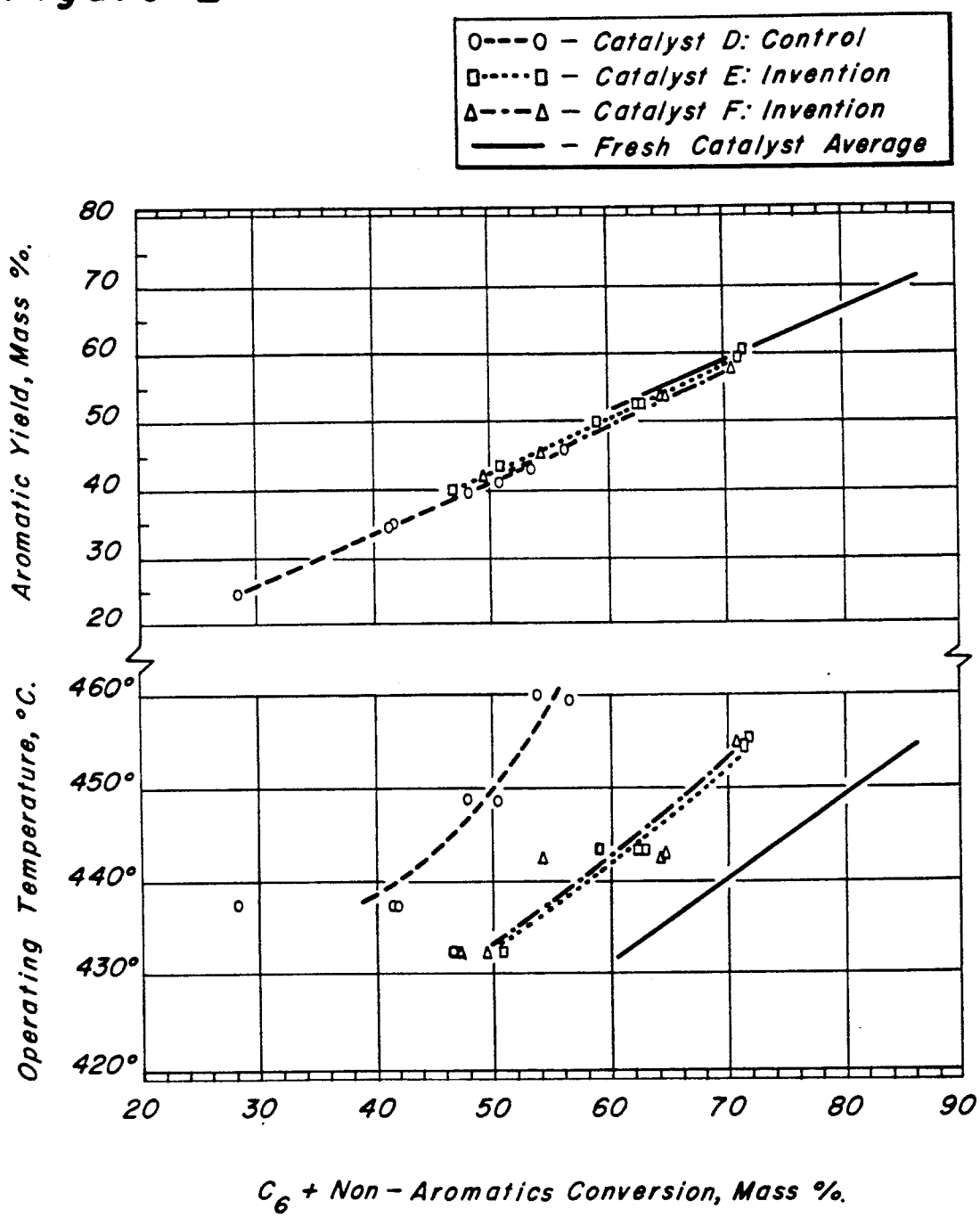

SULFUR REMOVAL FROM MOLECULAR-SIEVE CATALYST

BACKGROUND OF THE INVENTION

1. Field of the Invention

This invention relates to an improved regeneration procedure for sulfur-contaminated molecular-sieve catalysts used in the conversion of hydrocarbons, and more specifically for zeolite-containing catalysts used in the catalytic reforming of gasoline-range hydrocarbons.

2. General Background

The catalytic reforming of hydrocarbon feedstocks in the gasoline range is an important commercial process, practiced in nearly every significant petroleum refinery in the world to produce aromatic intermediates for the petrochemical industry or gasoline components with high resistance to engine knock. Demand for aromatics is growing more rapidly than the supply of feedstocks for aromatics production. Moreover, the widespread removal of lead antiknock additive from gasoline and the rising demands of highperformance internal-combustion engines are increasing the required knock resistance of the gasoline component as measured by gasoline "octane" number. The catalytic reforming unit therefore has been required to operate more efficiently at higher severity in order to meet these increasing aromatics and gasoline-octane needs. This trend has created a need for more effective reforming processes and catalysts.

Catalytic reforming generally is applied to a feedstock rich in paraffinic and naphthenic hydrocarbons and is effected through diverse reactions: dehydrogenation of naphthenes to aromatics, dehydrocyclization of paraffins, isomerization of paraffins and naphthenes, dealkylation of alkylaromatics, hydrocracking of paraffins to light hydrocarbons, and formation of coke which is deposited on the catalyst. Increased need for aromatics and gasoline octane have turned attention to the paraffin-dehydrocyclization reaction, which is less favored thermodynamically and kinetically in conventional reforming than other aromatization reactions. Considerable leverage exists for increasing desired product yields from catalytic reforming by promoting the dehydrocyclization reaction over the competing hydrocracking reaction while minimizing the formation of coke.

The effectiveness of reforming catalysts comprising a non-acidic L-zeolite and a platinum-group metal for dehydrocyclization of paraffins is well known in the art. The use of these reforming catalysts to produce aromatics from paraffinic raffinates as well as naphthas has been disclosed. The increased sensitivity of these selective catalysts to sulfur in the feed also is known. Nevertheless, this dehydrocyclization technology has not been commercialized during the intense and lengthy development period. The extreme catalyst sulfur sensitivity of current reforming catalysts selective for dehydrocyclization, providing surprising results when using novel methods for maintaining the performance of these catalysts such as the regeneration procedure of the present invention, is only now being recognized.

RELATED ART

The regeneration of a catalyst containing L-zeolite and platinum by hydrogen treating, calcination, oxychlorination, and hydrogen reactivation is disclosed in U.S. Pat. No. 4,493,901 (Bernard et al.). U.S. Pat. No. 4,810,683 (Cohn et al.) teaches a two-step process, including removal of carbonaceous materials with a gas containing oxygen and chlorine followed by hydrogen reduction. U.S. Pat. No. 4,925,819 (Fung et al.) discloses a method of reactivating a coke-containing L-zeolite/Group VIII noble metal catalyst by coke removal with oxygen, metal dispersion by oxychlorination, stabilization with an oxygen-containing gas, and reduction with hydrogen. None of these references, however, teach desulfurization of a sulfur-sensitive molecular-sieve catalyst.

U.S. Pat. No. 4,399,051 (Rabinovich et al.) discloses regeneration of a sulfur-poisoned rhodium catalyst used in hydrodealkylation using ammonia; Rabinovich et al. is specific to the conversion of rhodium sulfide, however. European Patent Office Publication 204 750 (Holtemann et al.) teaches rejuvenation of a sulfur-contaminated catalyst by contacting the catalyst with a large quantity of aqueous media without removing all the sulfur from the catalyst. Removal of sulfur from an L-zeolite/platinum catalyst by agglomerating platinum, removing sulfur from the platinum with CO and halogen, and redispersion of platinum redispersion by oxychlorination is taught in U.S. Pat. No. 4,851,380 (van Leirsburg et al.); however, van Leirsburg et al. do not suggest the sulfur-removal process of the present invention.

SUMMARY OF THE INVENTION

Objects

It is an object of the present invention to provide a process for reviving the activity of a sulfur-contaminated catalyst. A corollary objective is to remove sulfur from a sulfur-sensitive zeolitic catalyst which has accumulated sulfur from processing a sulfur-containing feedstock.

Summary

This invention is based on the discovery that ammonia may be used to remove sulfur from a deactivated L-zeolite catalyst in order to revive catalyst activity.

Embodiments

A broad embodiment of the present invention is a process for removing sulfur from a sulfur-contaminated catalyst comprising treating the catalyst with a nitrogen compound. The catalyst optimally contains a noble-metal component, especially platinum, and generally has been used in a reforming process in which the feedstock contained small amounts of sulfur. The catalyst preferably comprises a molecular sieve, more preferably a nonacidic large-pore molecular sieve and most preferably a nonacidic L-zeolite.

The optimal basic nitrogen compound used in the present process is ammonia, preferably contained in a gas stream which may comprise nitrogen, hydrogen, and/or water. Sulfur removal may be combined with catalyst regeneration including coke removal, oxychlorination, and reduction.

These as well as other objects and embodiments will become apparent from the detailed description of the invention.

BRIEF DESCRIPTION OF THE DRAWING

FIG. 1 and 2 illustrate the relationship of operating temperature to conversion and of aromatics yield to conversion for catalysts processed for sulfur removal according to the invention in comparison to control catalysts.

DESCRIPTION OF THE PREFERRED EMBODIMENTS

Figure 1:
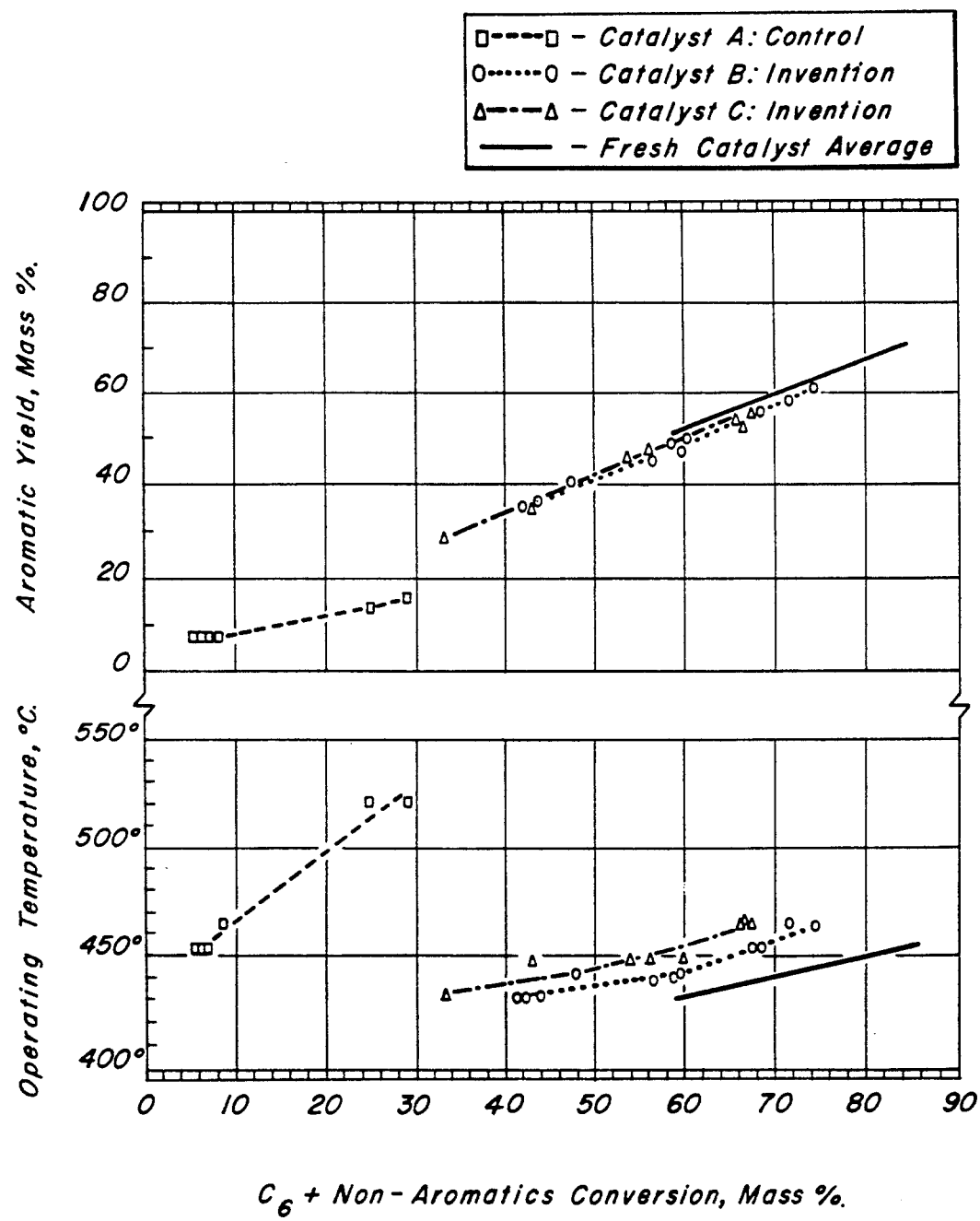

To reiterate, a broad embodiment of the present invention is a process for removing sulfur from a sulfur-sensitive molecular-sieve catalyst containing a noble metal comprising treating the catalyst with a nitrogen compound which preferably is or forms ammonia. Prior to the sulfur removal, the catalyst has been used in a process, usually a reforming process, processing a feedstock which contains small amounts of sulfur. By removing most of the sulfur from the catalyst according to the present process, the activity of the thus-desulfurized catalyst is revived.

The sulfur-sensitive conversion catalyst contains a molecular sieve, and preferably is a reforming catalyst containing a non-acidic large-pore molecular sieve. Suitable molecular sieves generally have a uniform pore opening or "pore size" of about 7 Å or larger and include those characterized as AFI, FAU or LTL structure type by the IUPAC Commission on Zeolite Nomenclature. The LTL structure is especially preferred, and the sulfur-sensitive catalyst optimally is a reforming catalyst comprising L-zeolite, an alkali-metal component and a platinum-group metal component.

It is essential that the L-zeolite be non-acidic, as acidity in the zeolite lowers the selectivity to aromatics of the finished catalyst. In order to be "non-acidic," the zeolite has substantially all of its cationic exchange sites occupied by nonhydrogen species. Preferably the cations occupying the exchangeable cation sites will comprise one or more of the alkali metals, although other cationic species may be present. An especially preferred nonacidic L-zeolite is potassium-form L-zeolite.

The catalyst may comprise other matrix or binder materials such as one or more of: (1) refractory inorganic oxides such as alumina, silica, titania, magnesia, zirconia, chromia, thoria, boria or mixtures thereof; (2) synthetically prepared or naturally occurring clays and silicates, which may be acid-treated; (3) crystalline zeolitic aluminosilicates, either naturally occurring or synthetically prepared such as FAU, MEL, MFI, MOR, MTW (IUPAC Commission on Zeolite Nomenclature), in hydrogen form or in a form which has been exchanged with metal cations; (4) spinels such as $MgAl_2O_4$, $FeAl_2O_4$, $ZnAl_2O_4$, $CaAl_2O_4$; and (5) combinations of materials from one or more of these groups.

Optimally the L-zeolite is composited with an inorganic-oxide binder in order to provide a convenient form for use in the catalyst of the present invention. One or more of silica, alumina or magnesia are preferred binder materials of the present invention. Amorphous silica is especially preferred, and excellent results are obtained when using a synthetic white silica powder precipitated as ultra-fine spherical particles from a water solution. The silica binder preferably is non-acidic, contains less than 0.3 mass % sulfate salts, and has a BET surface area of from about 120 to 160 $m^2/g$.

The L-zeolite and binder may be composited to form the desired catalyst shape by any method known in the art. For example, potassium-form L-zeolite and amorphous silica may be commingled as a uniform powder blend prior to introduction of a peptizing agent. An aqueous solution comprising sodium hydroxide is added to form an extrudable dough. The dough preferably will have a moisture content of from 30 to 50 mass % in order to form extrudates having acceptable integrity to withstand direct calcination. The resulting dough is extruded through a suitably shaped and sized die to form extrudate particles, which are dried and calcined by known methods. Alternatively, spherical particles may be formed by methods described hereinabove for the conversion catalyst of the physical mixture.

An alkali-metal component is an essential constituent of the sulfur-sensitive reforming catalyst. One or more of the alkali or alkaline earth metals, including lithium, sodium, potassium, rubidium, cesium, magnesium, calcium, strontium, barium, and mixtures thereof, may be used, with potassium being preferred. The alkali metal optimally will occupy essentially all of the cationic exchangeable sites of the non-acidic L-zeolite. Surface-deposited alkali metal also may be present as described in U.S. Pat. No. 4,619,906, incorporated herein by reference thereto.

A noble-metal component selected from the Group VIII (8–10) metals of the Periodic Table [See Cotton and Wilkinson, *Advanced Inorganic Chemistry*, John Wiley & Sons (Fifth Edition, 1988)] is another essential feature of the sulfur-sensitive reforming catalyst. Preferably the metal is selected from one or more of the group consisting of platinum and palladium, with a platinum component being especially preferred. The platinum may exist within the catalyst as a compound such as the oxide, sulfide, halide, or oxyhalide, in chemical combination with one or more other ingredients of the catalytic composite, or as an elemental metal. Best results are obtained when substantially all of the platinum exists in the catalytic composite in a reduced state. The platinum component generally comprises from about 0.05 to 5 mass % of the catalytic composite, preferably 0.05 to 2 mass %, calculated on an elemental basis.

It is within the scope of the present invention that the catalyst may contain other metal components known to modify the effect of the preferred platinum component. Such metal modifiers may include Group IVA(14) metals, non-noble Group VIII(8–10) metals, rhenium, indium, gallium, zinc, uranium, dysprosium, thallium and mixtures thereof. Catalytically effective amounts of such metal modifiers may be incorporated into the catalyst by any means known in the art.

The final sulfur-sensitive refroming catalyst generally will be dried at a temperature of from about 100° to 320° C. for about 0.5 to 24 hours, followed by oxidation at a temperature of about 150° to 600° C. (preferably about 300° C. to 550° C.) in an air atmosphere for 0.5 to 10 hours. Preferably the oxidized catalyst is subjected to a substantially water-free reduction step at a temperature of about 200° to 550° C. for 0.5 to 10 hours or more. The duration of the reduction step should be only as long as necessary to reduce the platinum, in order to avoid pre-deactivation of the catalyst, and may be performed in-situ as part of the plant startup if a dry atmosphere is maintained. Further details of the preparation and activation of embodiments of the sulfur-sensitive reforming catalyst are disclosed, e.g., in U.S. Pat. Nos. 4,619,906 (Lambert et al) and 4,822,762 (Ellig et al.), which are incorporated into this specification by reference thereto.

The sulfur-sensitive catalyst optionally may contain a halogen component. The halogen component may be either fluorine, chlorine, bromine or iodine or mixtures thereof. Chlorine is the preferred halogen component. The halogen component is preferably well dispersed throughout the catalyst and may comprise from more than 0.2 to about 15 wt. %. calculated on an elemental basis, of the final catalyst. Preferably the catalyst only contains halogen from preparation steps for incorporation of other catalyst components, such as a metal component, and effluent from a reaction using the catalyst contains no substantial amount of halogen.

The sulfur-sensitive catalyst is contained either in a fixed-bed reactor or in a moving-bed reactor whereby catalyst may be continuously withdrawn and added. These alternatives are associated with catalyst-regeneration options known to those of ordinary skill in the art, such as: (1) a semiregenerative unit containing fixed-bed reactors maintains operating severity by increasing temperature, eventually shutting the unit down for catalyst regeneration and reactivation; (2) a swing-reactor unit, in which individual fixed-bed reactors are serially isolated by manifolding arrangements as the catalyst become deactivated and the catalyst in the isolated reactor is regenerated and reactivated while the other reactors remain on-stream; (3) continuous regeneration of catalyst withdrawn from a moving-bed reactor, with reactivation and substitution of the reactivated catalyst, permitting higher operating severity by maintaining high catalyst activity through regeneration cycles of a few days; or: (4) a hybrid system with semiregenerative and continuous-regeneration provisions in the same unit. The present invention is particularly suited for use in processes based on fixed-bed reactors in a semiregenerative unit or on a swing-reactor unit.

The present sulfur-sensitive catalyst may be utilized in a hydrocarbon-conversion process. The catalyst system may be contained in one reactor or in multiple reactors with provisions known in the art to adjust inlet temperatures to individual reactors. The feed may contact the catalyst system in each of the respective reactors in either upflow, downflow, or radial-flow mode. Since the preferred reforming process operates at relatively low pressure, the low pressure drop in a radial-flow reactor favors the radial-flow mode.

A hydrocarbon feedstock to the hydrocarbon-conversion process usually is derived from the processing of petroleum. A naphtha feedstock to the preferred reforming process will comprise paraffins and naphthenes, and may comprise aromatics and small amounts of olefins, generally boiling within the gasoline range. Feedstocks which may be utilized include straight-run naphthas, natural gasoline, synthetic naphthas, thermal gasoline, catalytically cracked gasoline, partially reformed naphthas or raffinates from extraction of aromatics. The distillation range may be that of a full-range naphtha, having an initial boiling point typically from 40°–80° C. and a final boiling point of from about 160°–210° C., or it may represent a narrower range within a lower final boiling point. Light paraffinic feedstocks, such as naphthas from Middle East crudes having a final boiling point of from about 100°–160° C., are preferred due to the specific ability of the process to dehydrocyclize paraffins to aromatics. Raffinates from aromatics extraction, containing principally low-value $C_6$–$C_8$ paraffins which can be converted to valuable B-T-X aromatics, are especially preferred feedstocks.

The hydrocarbon feedstock to the present process contains small amounts of sulfur compounds, amounting to generally less than 10 parts per million (ppm) on an elemental basis. Preferably the hydrocarbon feedstock has been prepared from a contaminated feedstock by a conventional pretreating step such as hydrotreating, hydrorefining or hydrodesulfurization to convert such contaminants as sulfurous, nitrogenous and oxygenated compounds to $H_2S$, $NH_3$ and $H_2O$, respectively, which then can be separated from the hydrocarbons by fractionation. This conversion preferably will employ a catalyst known to the art comprising an inorganic oxide support and metals selected from Groups VIB(6) and VIII(9-10) of the Periodic Table. Alternatively or in addition to the conventional hydrotreating, the pretreating step may comprise contact with sorbents capable of removing sulfurous and other contaminants. These sorbents may include but are not limited to zinc oxide, iron sponge, high-surface-area sodium, high-surface-area alumina, activated carbons and molecular sieves; excellent results are obtained with a nickel-on-alumina sorbent. Preferably, the pretreating step will provide the reforming process with a naphtha feedstock having low sulfur levels disclosed in the prior art as desirable reforming feedstocks, e.g., 1 ppm to 0.1 ppm (100 ppb); sulfur levels of 0.5 to 0.15 ppm are usual in modern pretreating units. These amounts of sulfur, although small relative to the feedstock, are sufficient to cause deactivation when associated with the sulfur-sensitive catalyst over a period of months or years.

Sulfur also may accumulate on the catalyst from other sources, e.g. if sulfur-contaminated equipment releases sulfur into the feed to the reactors or sulfur is injected into the feed to the reactor. For example, sulfur amounting to about 0.1 ppm relative to the feedstock may be injected to passivate equipment surfaces such as heater tubes.

The hydrocarbon feedstock contacts the sulfur-sensitive catalyst at hydrocarbon-conversion conditions. Hydrocarbon-conversion conditions comprise a pressure of from about atmospheric to 150 atmospheres (abs), a temperature of from about 200° to 600° C., and a liquid hourly space velocity relative to the contaminant-sensitive catalyst of from about 0.2 to 20 $hr^{-1}$.

Preferably the feedstock is reformed and the conditions comprise reforming conditions including a pressure of from about atmospheric to 60 atmospheres (abs). More preferably the pressure is from atmospheric to 20 atmospheres (abs), and excellent results have been obtained at operating pressures of less than 10 atmospheres. The hydrogen to hydrocarbon mole ratio is from about 0.1 to 10 moles of hydrogen per mole of hydrocarbon feed. Space velocity with respect to the volume of contaminant-sensitive catalyst is from about 0.5 to 10 $hr^{-1}$. Operating temperature is from about 400° to 560° C. Since the predominant reaction of the preferred embodiment is the dehydrocyclization of paraffins to aromatics, the contaminant-sensitive catalyst will preferably be contained in two or more reactors with interheating between reactors to compensate for the endothermic heat of reaction and maintain suitable temperatures for dehydrocyclization.

The reforming process will produce an aromatics-rich effluent stream, with the aromatics content of the $C_5+$ portion of the effluent typically within the range of about 45 to 85 mass %. The composition of the aromatics will depend principally on the feedstock composition and operating conditions, and generally will consist principally of $C_6$–$C_{12}$ aromatics. Benzene, toluene and $C_8$ aromatics will be the primary aromatics produced from the preferred light naphtha and raffinate feedstocks.

After a period of time processing the hydrocarbon feedstock to produce the aromatics-rich stream, the sulfur-sensitive catalyst accumulates sufficient sulfur to cause unacceptable activity loss. The amount of time depends on the amount of sulfur in the feedstock, the space velocity relating feed and catalyst quantity, the sulfur tolerance of the catalyst, and the degree of acceptable activity loss. Typically this period of time is between one month and five years, more usually from about two months to three years. The sulfur associated with the catalyst at the point of unacceptable activity loss generally is from about 100 to 10,000 mass parts per million. In this context, "associated" means sulfur adsorbed on, chemically reacted with, or otherwise remaining with the catalyst during the processing of the feedstock as well as any sulfur accumulated prior to such processing.

At the point of unacceptable activity loss, the catalyst is considered sulfur-contaminated and processing of the feedstock is discontinued. The catalyst then is treated to revive its activity using the process of the invention.

One or more nitrogen compounds are introduced to the reactor containing the sulfur-contaminated catalyst, contacting the catalyst and reacting with sulfur to form compounds which disassociate from the catalyst. Nitrogen compounds useful in the present invention include but are not limited to ammonia, salts such as ammonium chloride, and organic compounds such as ethanolamine, ether amines, anilines, amides, and hydrazines. Preferably a nitrogen compound is employed which forms ammonia at conditions used to treat the catalyst. Most preferably, ammonia is introduced as a gas, in aqueous form, or as a compound which decomposes to form ammonia. Generally ammonia is introduced in a gaseous mixture with other components comprising one or more of nitrogen, hydrogen, and water. Preferably the gaseous mixture comprises nitrogen. Carbon dioxide, carbon monoxide, and oxygen may be but usually are not present in significant concentrations in the gaseous mixture. In an alternative preferred embodiment, the gaseous mixture comprises hydrogen; in this embodiment, hydrocarbons also may be present but oxygen and carbon oxides generally are substantially absent. The ammonia is present in the gaseous mixture in a concentration between 1 mol % and 100 mol %, and preferably at least about 5 mol %. compounds formed in the treatment include one or more hydrogen sulfide, compounds formed in the treatment include one or more of hydrogen sulfide, ammonium sulfide, ammonium sulfite, and/or ammonium sulfate.

Treatment conditions when using ammonia for sulfur removal include a temperature of between 250° and 800° C., preferably between 250° and 600° C., and a pressure of from atmospheric to about 30 atmospheres. The gaseous mixture may be utilized to pressurize the reactor or reactors containing the sulfur-contaminated catalyst to effect the reaction of ammonia and sulfur without circulation, or may be circulated through the reactor or through successive reactors at a gas hourly space velocity (GHSV) of up to about 10,000. The gaseous mixture contacts the catalyst for sufficient time to remove at least 50% of the associated sulfur, and preferably about 80% or more of the sulfur, from the catalyst in order to obtain a desulfurized catalyst. The sufficient time for sulfur removal is between 0.1 and 48 hours, preferably from about 0.5 to 24 hours, and optimally between about 1 and 12 hours. The sulfur-containing gaseous mixture then is sent to known means for separation and disposition of its valuable or harmful constituents, or recycled for further contact with and sulfur removal from the catalyst; in the latter event, a purge stream is removed from the sulfur-containing gaseous mixture to constituent separation. Reaction products of ammonia and sulfur remaining in reforming reactors may be removed by either or a combination of sweeping with an ammonia-free gaseous mixture and water washing; sweeping with gas is favored.

Following sulfur removal, the desulfurized catalyst may again be utilized advantageously to reform the hydrocarbon feedstock. A hydrogen purge is optimally effected between sulfur-removal and returning of the catalyst to reforming service in order to remove residual non-hydrocarbon contaminants and ensure optimal catalyst condition.

The sulfur removal may be utilized advantageously in conjunction with regeneration of the catalyst for removal of carbonaceous deposits accumulated during the reforming of the hydrocarbon feedstock. Regeneration steps typically comprise a carbon burn to remove carbonaceous deposits from the catalyst, oxychlorination to redistribute an agglomerated metal component, and reduction of the metal with hydrogen along with associated sweeps, purges and cooling. The sulfur removal may be effected prior to, following, or at any intermediate stage in the regeneration procedure. Sulfur removal prior to regeneration generally is preferred. Alternatively, the sulfur removal may be effected following the carbon-burn step and prior to the oxychlorination step.

Usually the reactors of the process containing deactivated catalyst are swept with a hydrogen-rich gas, containing from about 60 to 100 mol % hydrogen, to remove hydrocarbons from the catalyst and reactors. Preferably the reactors and catalyst then are purged with an inert gas such as nitrogen to remove hydrogen prior to the carbon burn. At least the purge with hydrogen optimally is carried out prior to the sulfur-removal step. Conditions for the hydrogen and nitrogen purge include a temperature of from about 300° to 600° and a pressure of from atmospheric to about 30 atmospheres.

The carbon-burn step of the regeneration involves contacting the deactivated catalyst with a gaseous mixture of oxygen and an inert gas. The oxygen content of this carbon-burn gas stream typically is from about 0.1 to 21 mol %, the arbitrary upper limit representing the concentration of oxygen in air, although a higher oxygen content may be desirable in some instances. Typical inert gases useful in the carbon-burn step include one or more nitrogen, helium, carbon dioxide and the like. The oxygen content may be held constant during the carbon burn, but preferably is slowly increased as the carbon is removed from the catalyst and the differential temperature across the catalyst bed from carbon combustion declines. The oxygen content advantageously can be increased to about 21 mol % by using air at the end of the carbon burn, but may be kept at a low level of 0.1 to 5 mol % if higher concentrations could effect thermal damage the zeolite of the catalyst.

A halogen or halogen-containing compound may be added to the carbon-burn gas, either during the entire carbon burn or during a portion of this step. The optional halogen component may be present in a concentration of from about 0.005 to 5 mol %, preferably in the range of 0.01 to 1.0 mol %, of the carbon-burn gas.

Carbon-burn conditions include a temperature of from about 350° to 600° C. The pressure is sufficient to maintain the flow of the carbon-burn gas through the reactors containing the deactivated catalyst, and ranges from atmospheric to about 30 atmospheres with a preferable upper limit of about 7 atmospheres. The flow of gas in the bed of catalyst particles is defined by a gas hourly space velocity of about 100 to 25,000 $hr_{-1}$, preferably up to about 8000 hr$_{-1}$. The duration of the carbon burn is sufficient for substantial removal of carbonaceous materials from the catalyst, and usually from about 5 to 30 hours. The carbon burn typically is terminated when the differential temperature across the reactors containing the catalyst is nearly zero for a period of about 0.5 to 5 hours.

The oxychlorination step effects combustion of residual carbon on the catalyst as well as redistribution of a metal component which may have become agglomerated. The catalyst from the carbon-burn step is contacted with an oxychlorination gas comprising from about 0.1 to 21 mol % oxygen, from about 0.005 to 5 mol % of a halogen component, and an inert gas such as nitrogen. The oxychlorination temperature preferably is at least about 20° C. higher than that used in the carbon-burn step in order to combust residual carbon, and preferably is within the range of 400° to 650° C. The pressure and space velocity are consistent with the teachings relating to the carbon burn, and the duration of this step is from about 0.5 to 12 hours.

The noble-metal component, preferably platinum or palladium, is redispersed during the oxychlorination step. The extent of metal agglomeration and of dispersion relative to fresh catalyst can be measured by hydrogen chemisorption, preferably the well known temperature-programmed desorption of hydrogen.

The catalyst from the oxychlorination step, which is substantially free of carbon, typically is purged with an inert gas such as nitrogen to displace oxygen and remove water prior to hydrogen contact. The duration of this purge is determined by analyzing the effluent gases from the reactors containing the catalyst until they are substantially free of water and oxygen.

The purged catalyst is contacted with a hydrogen-containing reducing gas to reduced the metallic component to an essentially elemental state. The reducing gas generally contains from 40 to 100 mol % hydrogen, with the non-hydrogen consitutents usually being hydrocarbons or nitrogen and preferably is substantially water-free. The reduction step is carried out at a temperature of between about 300° and 600° C., and preferably from 350° to 550° C., for at least about 0.5 to 5 hours. The pressure and space velocity are consistent with the teachings relating to the carbon burn and oxychlorination steps.

The purpose of the regeneration procedure is to produce a regenerated catalyst having activity, selectivity, and stability characteristics comparable to those possessed by the fresh catalyst. Following regeneration, the catalyst is returned to hydrocarbon-processing service.

EXAMPLES

The following examples are presented to illustrate a certain specific embodiment of the present invention in comparison to the prior art. These examples should not be construed to limit the scope of the invention as set forth in the claims. There are many possible other variations, as those of ordinary skill in the art will recognize, which are within the spirit of the invention.

The examples demonstrate the effectiveness of a process for removing sulfur from a sulfur-contaminated catalyst utilizing the present invention. Essentially duplicate fresh catalysts were used in all cases, comprising potassium-form L-zeolite and a silica binder and containing 0.82% mass % platinum. The catalysts were contaminated with sulfur and carbon from prior reforming tests as follows:

|        |        | Examples I-IV | Examples V-IX |
|--------|--------|---------------|---------------|
| Mass % | sulfur | 0.10          | 0.045         |
|        | carbon | 1.2           | 2.1           |

The hydrocarbon feedstock which was used to test the performance of the desulfurized and regenerated catalyst was a paraffinic raffinate from extraction of light aromatic compounds, and had the following characteristic:

| Sp. gr.          |            |     | 0.690 |
|------------------|------------|-----|-------|
| ASTM D-86, °C.: IBP |         | 70  |       |
|                  |            | 10% | 77    |
|                  |            | 50% | 86    |
|                  |            | 90% | 108   |
|                  |            | EP  | 137   |
| Volume %         | paraffins  |     | 90.4  |
|                  | naphthenes |     | 6.8   |
|                  | aromatics  |     | 2.8   |

The desulfurized, regenerated catalysts were tested at an operating pressure of 5 atmospheres, with temperature being varied to achieve conversion of $C_6+$ nonaromatics as indicated in the hereinafter-described Figure.

EXAMPLE I

The sulfur- and carbon-contaminated catalyst described hereinabove, containing 0.10 mass % sulfur and 1.2 mass % carbon, was subjected to a regeneration procedure not including the sulfur-removal process of the present invention. The regeneration comprised carbon burn, oxychlorination, and reduction with hydrogen.

The carbon burn was effected by heating the catalyst to 400° C. with a gas comprising nitrogen and containing 0.5 mol % oxygen. Hydrogen chloride was injected to a level of 0.125 mol % of the gas. Oxygen content gradually was raised to 5 mol % and the carbon burn was continued for four hours. Oxychlorination then was commenced as the temperature was raised to about 510° C. and the circulation of gas containing about 5 mol % oxygen was econtinued. Chlorine was injected to provide about 0.03 mol % $Cl_2$ in the gas stream. Oxychlorination was continued for about 8 hours. The catalyst then was purged and reduced with hydrogen for a period of about 1¼ hours.

The regenerated catalyst was essentially free of carbon and had a sulfur content of about 210 parts per million, representing approximately an 80% reduction in associated sulfur. The regenerated catalyst of Example I is designated Catalyst A.

EXAMPLE II

The same sulfur- and carbon-contaminated catalyst as in Example I was processed to remove sulfur prior to being regenerated. A gas stream consisting essentially of 30 mol % ammonia and the remainder nitrogen was circulated over the catalyst at about 700° C. for a period of approximately 6 hours. At the end of this period, the sulfur content of the desulfurized catalyst was 43 mass parts per million (ppm).

The desulfurized catalyst then was subjected to regeneration, including a carbon burn, oxychlorination, and reduction, in accordance with the conditions described in Example I. The sulfur content of the regenerated catalyst, designated Catalyst B, was less than 50 mass ppm.

EXAMPLE III

The same sulfur- and carbon-contaminated catalyst as in Examples I and II was subjected to a carbon burn as in Example I. The catalyst was heated to 400° C. with a gas comprising nitrogen and containing 0.5 mol % oxygen, and hydrogen chloride was injected to a level of 0.125 mol % of the gas. Oxygen content gradually was raised to 5 mol % and the carbon burn was continued for four hours.

After carbon removal, the catalyst was processed to remove sulfur prior to the remaining regeneration steps. A gas stream consisting essentially of 30 mol % ammonia and the remainder nitrogen was circulated over the catalyst at about 600° C. for a period of approximately 6 hours. At the end of this period, the sulfur content of the desulfurized catalyst was 68 mass ppm.

The desulfurized catalyst then was subjected to the remaining regeneration steps of oxychlorination and reduction, in accordance with the conditions described in Example I. The sulfur content of the regenerated catalyst, designated Catalyst C, was less than 50 mass ppm.

EXAMPLE IV

The performance of catalysts processed for sulfur removal according to the invention was compared to the performance of the control Catalyst A in reforming pilot-plant tests. Catalysts A, B, and C were tested in a reforming operation at 5 atmospheres and a hydrogen to hydrocarbon mol ratio of about 2. The operating temperature of the reforming tests was varied to effect a range of conversions of $C_6$ and heavier nonaromatics in the hereinbefore-described raffinate feedstock. Average results of tests at the same conditions on fresh catalyst which had not been contaminated by sulfur and carbon also are shown for comparison.

The results of the tests are plotted in FIG. 1. Conversion of $C_6+$ nonaromatics is shown as a function of operating temperature. The control Catalyst A was constrained to a conversion of only about 30 mass % before operating temperature approached practical limits. In contrast, Catalysts B and C which were processed for sulfur removal according to the invention achieved conversions approaching or exceeding 70 mass % at operating temperatures which approached the average for fresh, uncontaminated catalyst.

The yield performance of the catalysts is indicated in the Figure as mass % of total aromatics as a function of conversion of $C_6+$ nonaromatics. Control Catalyst A was able to achieve less than 20 mass % aromatics yield at the maximum practical conversion. Catalysts B and C, processed for sulfur removal according to the invention, yielded as high as 60 mass % aromatics. These yields were close to the yield-conversion relationship for fresh, uncontaminated catalyst.

EXAMPLE V

The sulfur- and carbon-contaminated catalyst described hereinabove, containing 0.045 mass % sulfur and 2.1 mass % carbon, was subjected to a regeneration procedure not including the sulfur-removal process of the present invention. The regeneration comprised a carbon burn, oxychlorination, and reduction with hydrogen.

The carbon burn was effected by heating the catalyst to 400° C. with a gas comprising nitrogen and containing 0.5 mol % oxygen. Hydrogen chloride was injected to a level of 0.125 mol % of the gas. Oxygen content gradually was raised to 5 mol % and the carbon burn was continued for four hours. Oxychlorination then was commenced as the temperature was raised to about 510° C. and the circulation of gas containing about 5 mol % oxygen was continued. Chlorine was injected to provide about 0.03 mol % $Cl_2$ in the gas stream. Oxychlorination was continued for about 8 hours. The catalyst then was purged and reduced with hydrogen for a period of about 1¼ hours.

The regenerated catalyst was essentially free of carbon and had a sulfur content of about 124 parts per million, representing a reduction in associated sulfur of over 75%. The regenerated catalyst of Example V is designated Catalyst D.

EXAMPLE VI

The same sulfur- and carbon-contaminated catalyst as in Example V was processed to remove sulfur prior to being regenerated. A gas stream consisting essentially of 30 mol % ammonia and the remainder hydrogen was circulated over the catalyst at about 610° C. for a period of approximately 11¼ hours. At the end of this period, the sulfur content of the desulfurized catalyst was 205 mass parts per million (ppm).

The desulfurized catalyst then was subjected to regeneration, including a carbon burn, oxychlorination, and reduction, in accordance with the conditions described in Example V. The sulfur content of the regenerated catalyst, designated Catalyst E, was 119 mass ppm.

EXAMPLE VII

The same sulfur- and carbon-contaminated catalyst as in Example V was processed to remove sulfur prior to being regenerated. A gas stream consisting essentially of 30 mol % ammonia and the remainder hydrogen was circulated over the catalyst at about 610° C. for a period of approximately 24 hours. At the end of this period, the sulfur content of the desulfurized catalyst was 133 mass parts per million (ppm).

The desulfurized catalyst then was subjected to regeneration, including a carbon burn, oxychlorination, and reduction, in accordance with the conditions described in Example V. The sulfur content of the regenerated catalyst, designated Catalyst F, was below detectable levels.

EXAMPLE VII

The performance of catalysts processed for sulfur removal according to the invention was compared to the performance of the control Catalyst A in reforming pilot-plant tests. Catalysts D, E, and F were tested in a reforming operation at 5 atmosphere and a hydrogen to hydrocarbon mol ratio of about 2. The operating temperature of the reforming tests was varied to effect a range of conversions of $C_6$ and heavier nonaromatics in the hereinbefore-described raffinate feedstock. Average results of tests at the same conditions on fresh catalyst which had not been contaminated by sulfur and carbon also are shown for comparison.

The results of the tests are plotted in FIG. 2. Conversion of $C_6+$ nonaromatics is shown as a function of operating temperature. The control Catalyst D was constrained to a conversion of well under 60 mass % before operating temperature approached practical limits. In contrast, Catalysts B and C which were processed for sulfur removal according to the invention achieved conversions exceeding 70 mass % at operating temperatures which were much closer to the average for fresh, uncontaminated catalyst.

The yield performance of the catalysts is indicated in the Figure as mass % of total aromatics as a function of conversion of $C_6+$ nonaromatics. Control Catalyst D was able to achieve only about 45 mass % aromatics yield at the maximum practical conversion. Catalysts E and F, processed for sulfur removal according to the invention, yielded as high as 60 mass % aromatics. These yields were close to the yield-conversion relationship for fresh, uncontaminated catalyst.

EXAMPLE IX

Conditions were varied for sulfur removal from the sulfur- and carbon-contaminated catalyst of Example V. A gas stream consisting essentially of ammonia and the remainder hydrogen was circulated over the catalyst at several different sets of space velocity (GHSV), ammonia concentration, temperature and time periods with results as follows (sulfur expressed as mass parts per million on the treated catalyst):

| Catalyst: | G | H | J | K | L | M |
|---|---|---|---|---|---|---|
| GHSV | 1000 | 1000 | 500 | 500 | 3000 | 3000 |
| $NH_3$, mole % | 30 | 30 | 30 | 30 | 30 | 5 |
| Temp., °C. | 610 | 610 | 610 | 610 | 610 | 565 |
| Time, hr | 11½ | 24 | 24 | 24 | 9 | 24 |
| Sulfur, ppm | 205 | 133 | 186 | 215 | 113 | <100 |

Catalysts G and H correspond to the catalysts designated above as E and F, respectively, after regeneration for carbon removal.

We claim:

1. A process for regenerating and removing associated sulfur from a sulfur-contaminated sulfur-sensitive reforming catalyst which contains nonacidic L-zeolite, an alkali-metal component and a platinum component consisting essentially of the steps of:

(a) treating the contaminated catalyst at treatment conditions including a temperature of between about 250° and 800° C. with a gaseous mixture which comprises one or both of ammonia and a nitrogen compound which decomposes to form ammonia at conditions used to treat the catalyst to provide ammonia in a concentration in the gaseous mixture of between 1 and 100 mol % for a sufficient time to remove at least 50% of the associated sulfur and obtain a desulfurized catalyst;

(b) contacting the desulfurized catalyst with an oxygen-containing gas at carbon-burn conditions;

(c) redistributing the platinum on the reduced-coke catalyst at oxychlorination conditions with a chlorine- and oxygen-containing gas;

(d) cooling the oxychlorinated catalyst with one or more cooling gases in series; and, (e) reducing the platinum with a hydrogen-containing gas to obtain a regenerated, desulfurized catalyst.

2. The process of claim 1 wherein the gaseous mixture in step (a) comprises one or more components selected from the group consisting of nitrogen, hydrogen, and water.

3. The process of claim 1 wherein the temperature is from about 450° to 750° C. in step a.

4. The process of claim 1 wherein the treatment conditions comprise a pressure of from about atmospheric to 50 atmospheres in step (a).

5. The process of claim 1 wherein the sufficient time is from about 0.5 to 72 hours in step (a).

6. The process of claim 1 wherein the alkali-metal component comprises a potassium component.

7. The process of claim 1 wherein the sulfur-sensitive catalyst comprises an inorganic oxide binder.

* * * * *